US012769003B2

(12) United States Patent
Shim

(10) Patent No.: US 12,769,003 B2

(45) Date of Patent: Oct. 20, 2026

(54) INTEGRATED LAMP DEVICE FOR A VEHICLE

(71) Applicants: HYUNDAI MOTOR COMPANY, Seoul (KR); KIA CORPORATION, Seoul (KR)

(72) Inventor: Joon Bo Shim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 941 days.

(21) Appl. No.: 18/100,976

(22) Filed: Jan. 24, 2023

(65) Prior Publication Data

US 2024/0118426 A1 Apr. 11, 2024

(30) Foreign Application Priority Data

Oct. 5, 2022 (KR) ........................ 10-2022-0127034

(51) Int. Cl.

*G01S 17/931* (2020.01)
*B60Q 1/04* (2006.01)
*F21V 29/70* (2015.01)
*G01S 7/481* (2006.01)

(52) U.S. Cl.

CPC .............. *G01S 17/931* (2020.01); *B60Q 1/04* (2013.01); *F21V 29/70* (2015.01); *G01S 7/4812* (2013.01); *G01S 7/4813* (2013.01); *G01S 7/4814* (2013.01)

(58) Field of Classification Search

CPC .......... F21V 29/70; F21V 7/00; F21V 14/006; F21V 33/00; G01S 17/931; G01S 7/4812; G01S 7/4813; G01S 7/4814; G01S 2013/93277; G01S 7/4817; G01S 17/42; B60Q 1/04; B60Q 1/0023; F21S 41/143; F21S 41/321; F21S 41/365; F21S 41/37; F21S 41/675; F21S 41/10; F21S 41/141; F21S 41/192; F21S 41/30; F21S 41/18; F21S 41/285; F21S 41/635; F21W 2102/13; F21W 2107/10; F21Y 2115/10

See application file for complete search history.

(56) References Cited

U.S. PATENT DOCUMENTS

| | | | | |
|---|---|---|---|---|
| 10,302,271 | B2 * | 5/2019 | Na | F21S 41/689 |
| 10,625,661 | B2 | 4/2020 | Lee | |
| 10,647,246 | B2 | 5/2020 | Lim et al. | |
| 10,953,787 | B2 | 3/2021 | Bauch et al. | |
| 11,161,451 | B1 | 11/2021 | Chen et al. | |

(Continued)

FOREIGN PATENT DOCUMENTS

| | | | |
|---|---|---|---|
| KR | 20090096994 | A | 9/2009 |
| KR | 101734234 | B1 | 5/2017 |

(Continued)

*Primary Examiner* — Isam A Alsomiri
*Assistant Examiner* — Joseph C Fritchman
(74) *Attorney, Agent, or Firm* — Lempia Summerfield Katz LLC

(57) ABSTRACT

An integrated lamp device for a vehicle includes a first light source module for lidar sensing and a second light source module for beam patterning installed in a single housing, thereby reducing an overall size. Further, an aiming adjustment is performed by a reflection unit separated from the light source modules, thereby stabilizing a structure and ensuring durability performance.

9 Claims, 7 Drawing Sheets

(56) References Cited

U.S. PATENT DOCUMENTS

| | | | | |
|---|---|---|---|---|
| 2009/0046474 | A1 * | 2/2009 | Sato | F21S 41/143 362/466 |
| 2011/0044063 | A1 * | 2/2011 | Yamamoto | B60Q 1/076 362/428 |
| 2020/0174100 | A1 * | 6/2020 | Hori | B60Q 1/0023 |
| 2021/0129737 | A1 | 5/2021 | Sakaguchi et al. | |
| 2023/0038167 | A1 | 2/2023 | Shim et al. | |
| 2024/0329334 | A1 * | 10/2024 | Nguyen | G02B 6/4202 |
| 2025/0004139 | A1 * | 1/2025 | Brenner | G01S 7/4816 |

FOREIGN PATENT DOCUMENTS

| | | | |
|---|---|---|---|
| KR | 101755513 | B1 | 7/2017 |
| KR | 101755514 | B1 | 7/2017 |
| KR | 20230021487 | A | 2/2023 |

* cited by examiner

INTEGRATED LAMP DEVICE FOR A VEHICLE

CROSS REFERENCE TO RELATED APPLICATION

The present application claims priority to Korean Patent Application No. 10-2022-0127034, filed Oct. 5, 2022, the entire contents of which are incorporated herein for all purposes by this reference.

BACKGROUND

Field of the Disclosure

The present disclosure relates to an integrated lamp device for a vehicle, in which a function of a headlamp and a function of a lidar are implemented in a single space. More particularly, the present disclosure relates to an integrated lamp device for a vehicle in which a function for aiming adjustment may be performed on the headlamp, and an entire package is miniaturized.

Description of the Related Art

In general, a vehicle is equipped with a lighting device used to allow a driver to easily identify an object positioned in a traveling direction, i.e., in front of the vehicle while the vehicle travels at night and to inform drivers in other vehicles and pedestrians on the road of a traveling state of the host vehicle. A headlamp, which is also called a headlight, serves to illuminate a location in front of the vehicle in the traveling direction of the vehicle.

In addition, recently, an autonomous vehicle is equipped with a lidar to implement autonomous driving. The lidar is configured to detect a distance between the vehicle and a target by emitting a laser beam and measuring the time the laser beam is transmitted and received between the target and a sensor.

A position at which the lidar is installed on the vehicle is similar to an installation position of the headlamp. However, because the lidar and the headlamp are installed at different positions within a similar vicinity, an installation space for the headlamp and an installation space for the lidar need to be separately ensured.

In addition, because the headlamp and the lidar are separately installed, there are problems in that an installation space required for both increases and the number of constituent components increases. In the case that an optimum installation position for the headlamp and an optimum installation position for the lidar are identical to each other, the installation positions need to be changed, at least for one of the headlamp or the lidar, even though any one of the functions cannot be implemented properly.

In addition, recently, a headlamp is configured such that a light emission direction of the headlamp is changed by adjustment of the aiming direction. Because an optical module, which constitutes the headlamp, includes an LED, a reflector, a heat sink, a bracket, and the like, and thus has a heavy weight, there is a problem in that the aiming adjustment cannot be performed because of various reasons such as a posture of the vehicle, a mounted state of the lamp, or dispersion of components.

The foregoing described as the background is intended merely to aid in understanding the background of the present disclosure. The background is not intended to mean that the present disclosure falls within the purview of the related art that is already known to those having ordinary skill in the art.

SUMMARY

The present disclosure is proposed to solve these problems and aims to provide an integrated lamp device for vehicles in which a function of a headlamp and a function of a lidar are implemented in a single space, aiming adjustment may be performed on the headlamp, an entire package is miniaturized, and structures between components are stabilized.

To achieve the above-mentioned objects, an embodiment of the present disclosure provides an integrated lamp device for a vehicle. The integrated lamp device includes a housing having a light exiting part, and a first light source module installed in the housing. The first light source is configured to emit lidar sensing light so that the lidar sensing light is moved to the light exiting part. The integrated lamp device further includes a second light source module installed in the housing, spaced apart from the first light source module, and configured to emit beam patterning light to a movement path for the lidar sensing light. Additionally, the integrated light source includes a reflection unit that includes a mirror filter provided at a position at which the lidar sensing light of the first light source module and the beam patterning light of the second light source module overlap each other. The mirror filter is configured to transmit the lidar sensing light and reflect the beam patterning light, in which the mirror filter is configured to be tiltable.

The housing may include a first installation part disposed to be opposite to the light exiting part and having the first light source module therein. The housing may also include a second installation part disposed between the first installation part and the light exiting part, and spaced apart upward or downward from the first installation part and the light exiting part. The second installation part may be configured to be penetrated inward and outward so that the second light source module is detachably provided in the second installation part.

The first light source module may include a first light source part configured to emit the lidar sensing light and may include a sensing part configured to receive the lidar sensing light that exits through the light exiting part and returns by being reflected.

The second light source module may include a second light source part configured to emit the beam patterning light and may include a heat sink coupled to the second light source part and configured to dissipate heat. The second light source module may further include a reflective mirror configured to reflect the beam patterning light emitted from the second light source part so that the beam patterning light moves to the movement path for the lidar sensing light.

The reflection unit may include a mirror filter configured to transmit the lidar sensing light and reflect the beam patterning light and may include a pivot bracket that is tiltably installed in the housing and connected to the mirror filter. The reflection unit may further include a drive unit installed in the housing, connected to the pivot bracket, and configured to adjust a tilting angle of the mirror filter together with the pivot bracket, depending on whether the drive unit operates.

The mirror filter may be inclined at a preset angle with respect to the movement path for the lidar sensing light.

The pivot bracket may include a fixed part fixed to the housing and a rotary part that is tiltably installed on the fixed part. The mirror filter may be mounted on the rotary part and the drive unit may be connected to the rotary part.

The drive unit may include a motor part installed on the housing and configured to transmit power. The drive unit may also include a rod part configured to rectilinearly move by receiving power from the motor part, connected to the rotary part, and configured to change the tilting angle of the mirror filter together with the rotary part in accordance with a movement position of the rod part.

Whether to operate the drive unit may be determined by an instruction of a controller. The controller may adjust the tilting angle of the mirror filter when an instruction to emit a low or high beam is provided by the controller. When the controller provides the instruction to emit a low or high beam, the lidar sensing light is emitted toward the light exiting part and the beam patterning light exits through the light exiting part to a high-beam pattern region or a low-beam pattern region.

Another embodiment of the present disclosure provides an integrated lamp device for a vehicle. The integrated lamp device includes a housing having a light exiting part and a first light source module. The first light source module may be disposed in a direction orthogonal to an imaginary line passing through the light exiting part in the housing. The first light source module is configured to emit lidar sensing light. The integrated lamp device further includes a second light source module disposed in a direction orthogonal to the imaginary line passing through the light exiting part in the housing. The second light source module is disposed at a position farther from the light exiting part than the first light source module and is configured to emit beam patterning light. The integrated lamp device further includes a reflection unit including a reflector configured such that the lidar sensing light of the first light source module and the beam patterning light of the second light source module enter the reflector. The reflector is configured to move the beam patterning light toward the light exiting part. The reflection unit further includes a mirror filter configured to reflect the lidar sensing light and transmit the beam patterning light. The reflector and the mirror filter are configured to be tiltable.

The housing may include a first installation space having the first light source module provided in the direction orthogonal to the imaginary line passing through the light exiting part. The housing may further include a second installation space provided to be spaced apart from the first installation space in a direction away from the light exiting part and to be penetrated inward and outward so that the second light source module is detachably provided in the second installation space.

The reflection unit may include the reflector disposed at a position at which the beam patterning light moves. The reflector may be configured to reflect the beam patterning light so that the beam patterning light moves toward the light exiting part. The reflection unit may further include the mirror filter provided between the reflector and the light exiting part and disposed at a position at which the lidar sensing light and the beam patterning light overlap each other. The mirror filter may be configured to reflect the lidar sensing light and transmit the beam patterning light. The reflection unit may further include a pivot bracket tiltably installed in the housing and connected to allow the reflector and the mirror filter to be tilted at the same tilting angle. The reflection unit may also include a drive unit installed in the housing, connected to the pivot bracket, and configured to adjust a tilting angle of the reflector and a tilting angle of the mirror filter depending on whether the drive unit operates.

Whether to operate the drive unit may be determined by an instruction of a controller. The controller may adjust the tilting angle of the reflector and the tilting angle of the mirror filter when an instruction to emit a low or high beam is provided by the controller. When the controller provides the instruction to emit a low or high beam, the lidar sensing light and the beam patterning light exit through the light exiting part in the same direction to a high-beam pattern region or a low-beam pattern region.

According to the integrated lamp device for a vehicle structured as described herein, the first light source module for lidar sensing and the second light source module for beam patterning are installed in the single housing, thereby reducing the overall size. Further, the aiming adjustment is performed by the reflection unit that is separated from the light source modules, thereby stabilizing the structure and ensuring durability performance.

DETAILED DESCRIPTION

Figure 1:
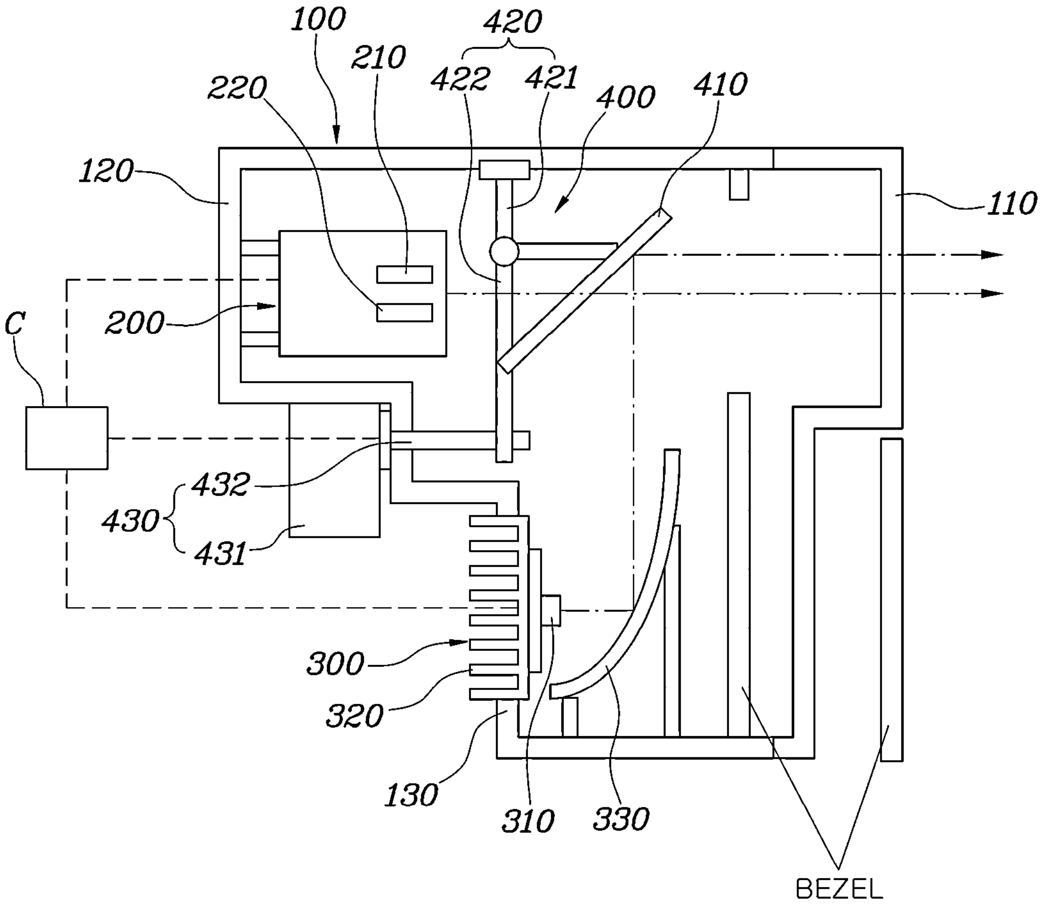
FIG. 1 is a view illustrating an integrated lamp device for a vehicle according to an embodiment of the present disclosure.

Hereinafter, embodiments disclosed in the present specification are described in detail with reference to the accompanying drawings. The same or similar constituent elements are assigned with the same reference numerals throughout the drawings. The repetitive descriptions thereof have been omitted.

The suffixes 'module,' 'unit,' 'part,' and 'portion' used to describe constituent elements in the following description are used together or interchangeably in order to facilitate the description. However, the suffixes themselves do not have distinguishable meanings or functions.

In the description of the embodiments disclosed in the present specification, the specific descriptions of publicly known related technologies have been omitted where it has been determined that the specific descriptions may obscure the subject matter of the embodiments disclosed in the present specification.

In addition, it should be understood that the accompanying drawings are provided only to allow those having ordinary skill in the art to understand the embodiments disclosed in the present specification. The technical spirit of the concepts disclosed in the present specification is not limited by the accompanying drawings, and includes all alterations, equivalents, and alternatives that are included in the spirit and the technical scope of the present disclosure.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

Singular expressions include plural expressions unless clearly described as different meanings in the context.

In the present specification, it should be understood the terms "comprises," "comprising," "includes," "including," "containing," "has," "having," or other variations thereof are inclusive and therefore specify the presence of stated features, integers, steps, operations, elements, components, or combinations thereof. However, the terms do not preclude the presence or addition of one or more other features, integers, steps, operations, elements, components, or combinations thereof.

When a component, device, element, or the like of the present disclosure is described as having a purpose or performing an operation, function, or the like, the component, device, or element should be considered herein as being "configured to" meet that purpose or to perform that operation or function.

A controller may include a communication device configured to communicate with another controller or a sensor to control a corresponding function, a memory configured to store an operating system, a logic instruction, input/output information, and one or more processors. The one or more processors are configured to perform determination, computation, decision, or the like required to control the corresponding function.

Hereinafter, an integrated lamp device for a vehicle according to an embodiment of the present disclosure is described with reference to the accompanying drawings.

Figure 2:
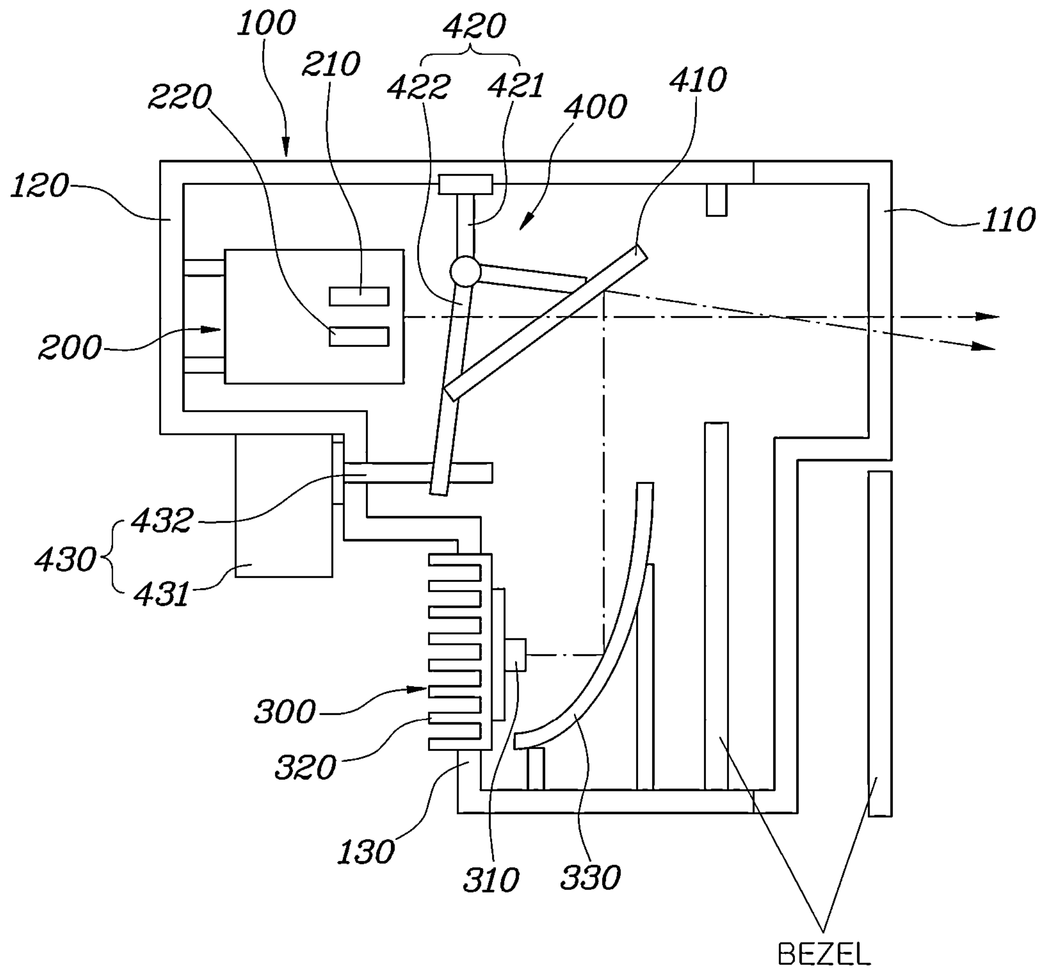
FIG. 2 is a view illustrating an operating state of the integrated lamp device for a vehicle illustrated in FIG. 1.

FIG. 1 is a view illustrating an integrated lamp device for a vehicle according to an embodiment of the present disclosure. FIG. 2 is a view illustrating an operating state of the integrated lamp device for a vehicle illustrated in FIG. 1.

Figure 3:
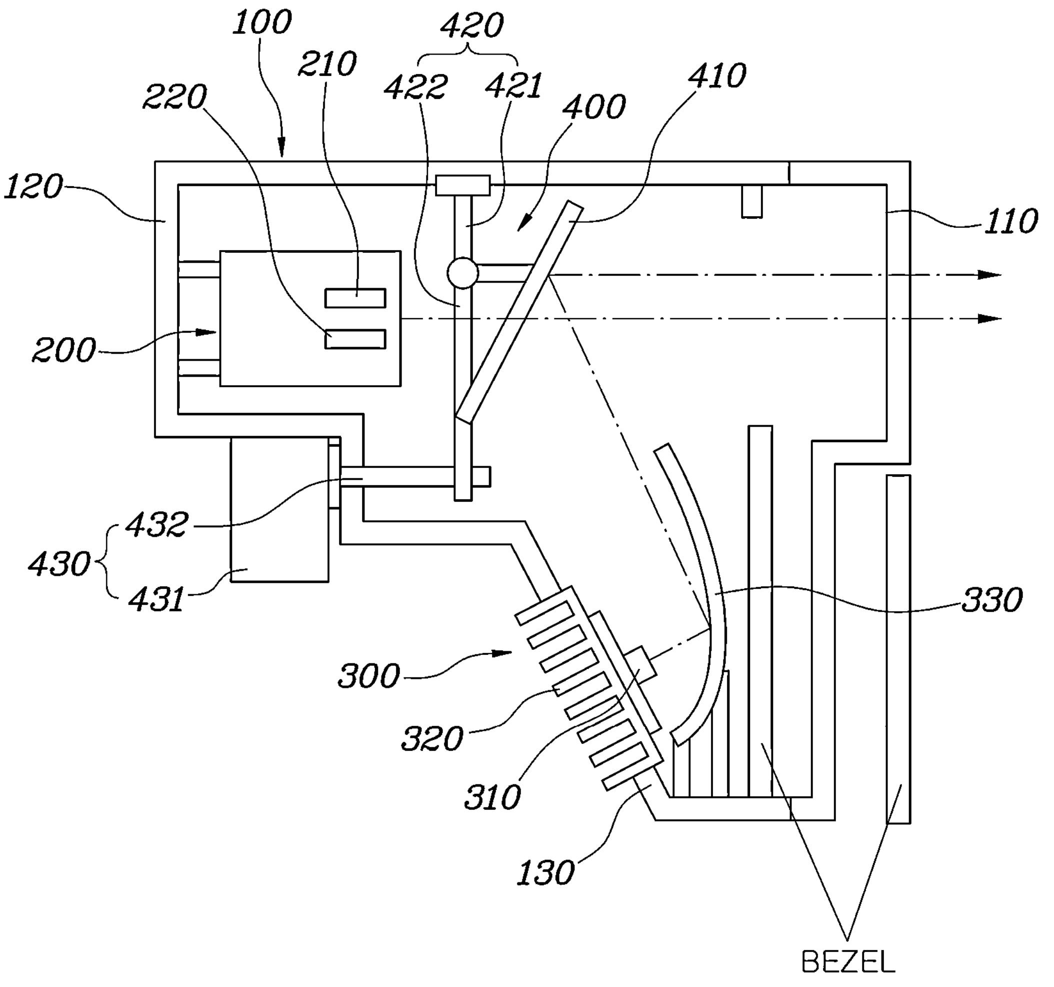
FIG. 3 is a view illustrating an integrated lamp device for a vehicle according to another embodiment of the present disclosure.
Figure 4:
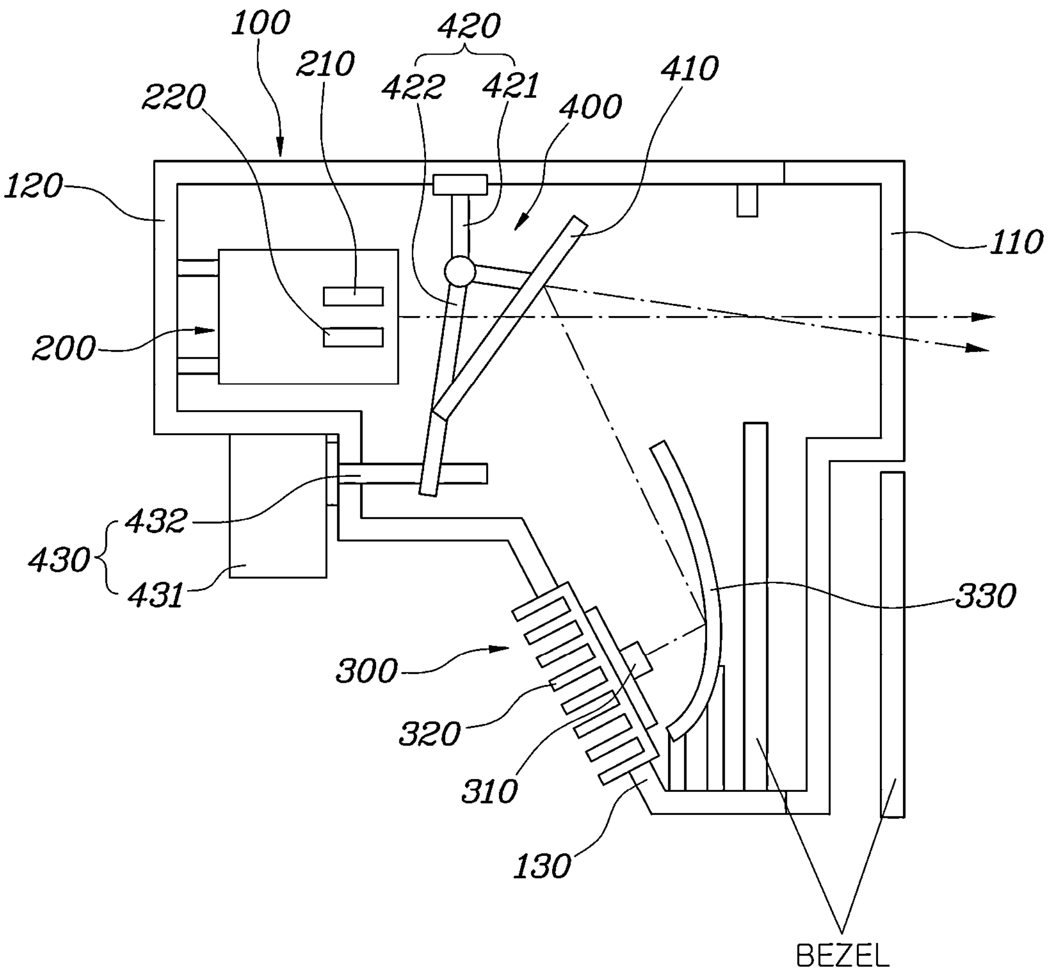
FIG. 4 is a view illustrating an operating state of the integrated lamp device for a vehicle illustrated in FIG. 1.

FIG. 3 is a view illustrating an integrated lamp device for a vehicle according to another embodiment of the present disclosure. FIG. 4 is a view illustrating an operating state of the integrated lamp device for a vehicle illustrated in FIG. 1.

Figure 5:
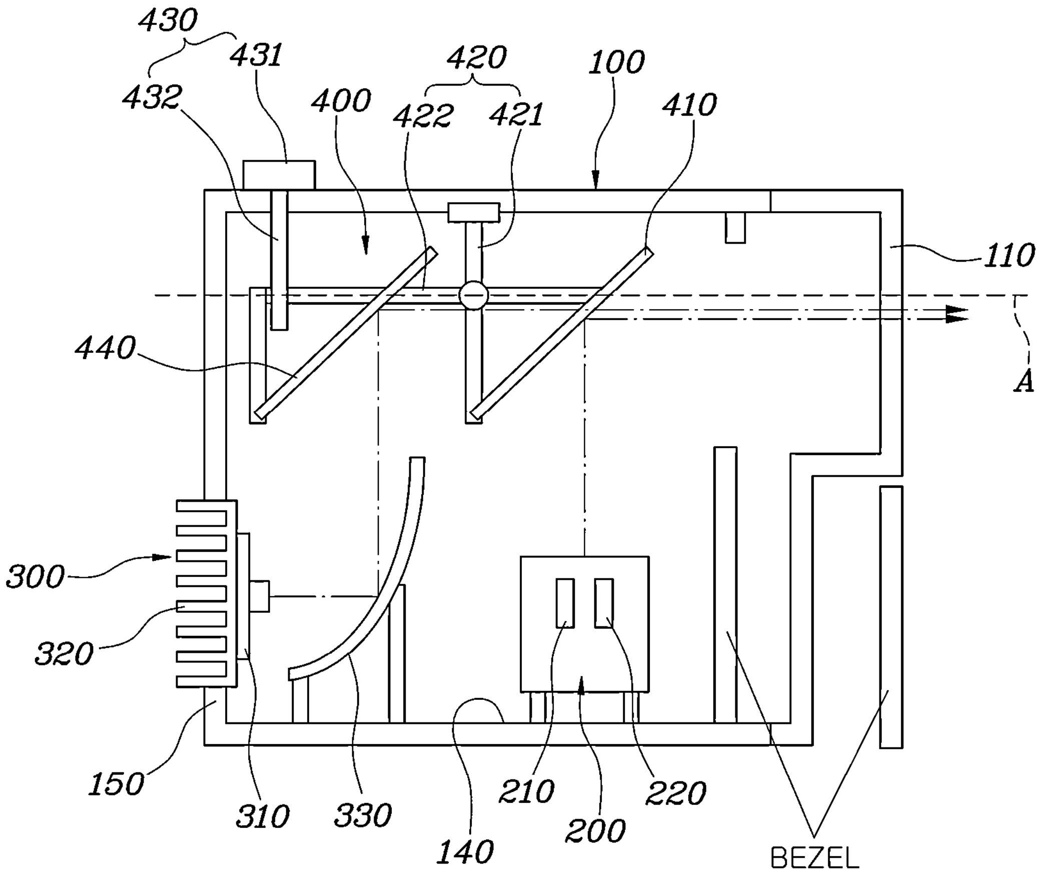
FIG. 5 is a view illustrating an integrated lamp device for a vehicle according to another embodiment of the present disclosure.
Figure 6:
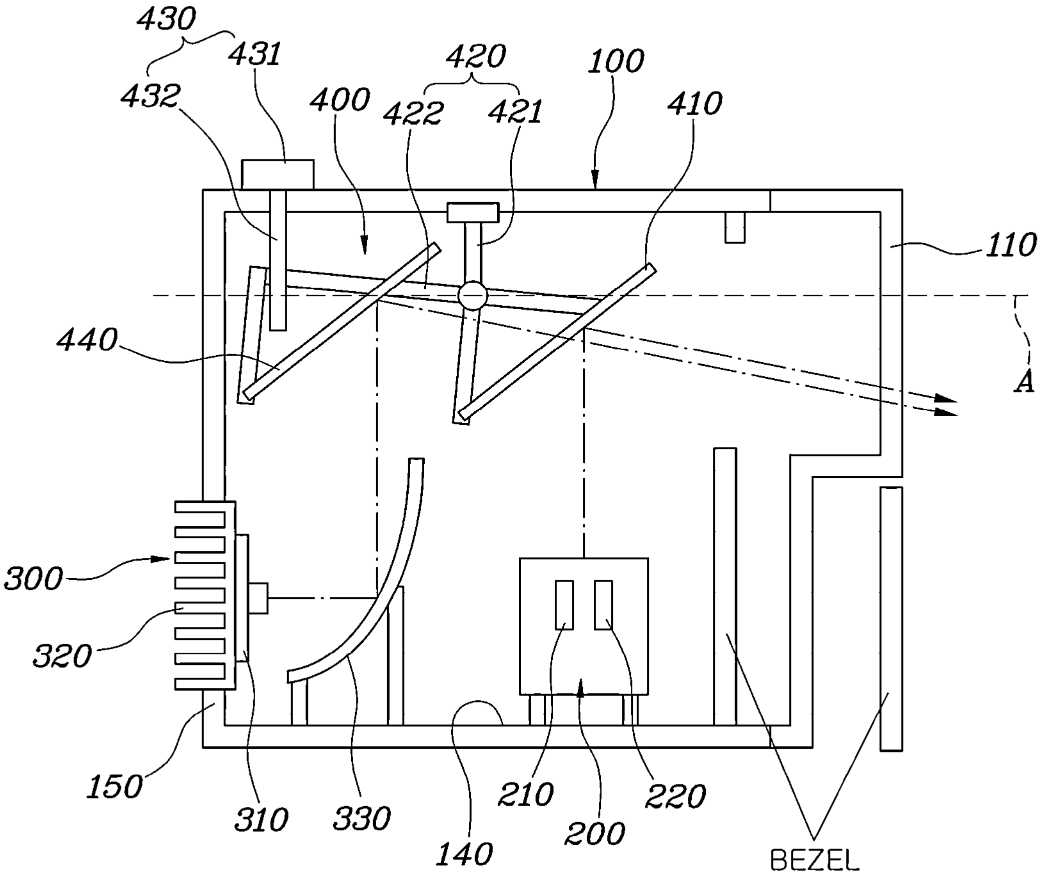
FIG. 6 is a view illustrating an operating state of the integrated lamp device for a vehicle illustrated in FIG. 1.

FIG. 5 is a view illustrating an integrated lamp device for a vehicle according to another embodiment of the present disclosure. FIG. 6 is a view illustrating an operating state of the integrated lamp device for a vehicle illustrated in FIG. 1.

Figure 7:
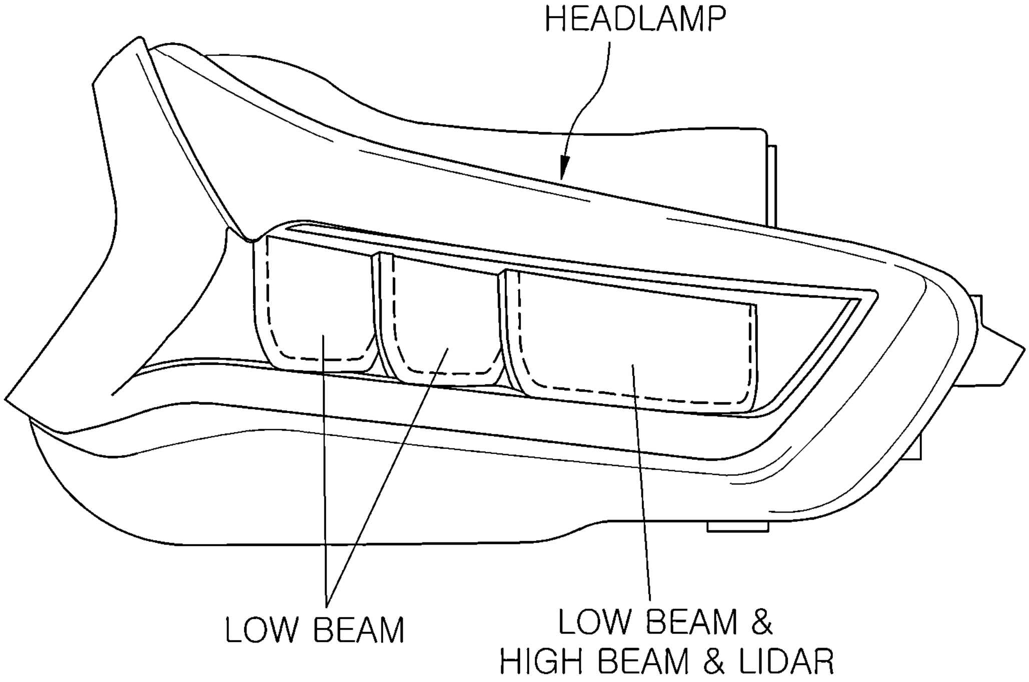
FIG. 7 is a view illustrating an application example of an embodiment of the present disclosure.

FIG. 7 is a view illustrating an application example of an embodiment of the present disclosure.

As illustrated in FIGS. 1 and 2, the integrated lamp device for a vehicle according to an embodiment of the present disclosure includes a housing 100 having a light exiting part 110, and a first light source module 200 installed in the housing 100. The first light source module 200 is configured to emit lidar sensing light so that the lidar sensing light is moved to the light exiting part 110. The integrated lamp device for a vehicle further includes a second light source module 300 installed in the housing 100, spaced apart from the first light source module 200, and configured to emit beam patterning light to a movement path for the lidar sensing light. Further, the integrated lamp device for a vehicle includes a reflection unit 400, which includes a mirror filter 410 provided at a position at which the lidar sensing light of the first light source module 200 and the beam patterning light of the second light source module 300 overlap each other. The mirror filter 410 is configured to transmit the lidar sensing light and reflect the beam patterning light. The mirror filter 410 is configured to be tiltable.

As described herein, in the present disclosure, the first light source module 200 for emitting the lidar sensing light and the second light source module 300 for emitting the beam patterning light are provided in the housing 100. Further, the lidar sensing light and the beam patterning light exit through the same light exiting part 110 to the outside.

In addition, the reflection unit 400 is tiltably installed in the housing 100 and configured to transmit the lidar sensing light and reflect the beam patterning light. The lidar sensing light exits the housing in a particular fixed direction even though the reflection unit 400 is tilted. A light exiting position of the beam patterning light is adjusted in the form of a low beam or a high beam through the light exiting part 110 in accordance with a tilting angle of the reflection unit 400.

As described herein, in the present disclosure, the first light source module 200 and the second light source module 300 are provided in the single housing 100 and modularized such that an entire package is miniaturized. In particular, a light exiting direction of the lidar sensing light emitted from the first light source module 200 and a light exiting direction of the beam patterning light emitted from the second light source module 300 are determined by the reflection unit 400. Therefore, it is possible to implement a low or high beam while detecting an outside object.

An embodiment of the present disclosure is described specifically below. The housing 100 may include a first installation part 120 disposed to be opposite to the light exiting part 110 and having the first light source module 200 therein. The housing may further include a second installation part 130 disposed between the first installation part 120 and the light exiting part 110. The second installation part 130 is also spaced apart upward or downward from the first installation part 120 and the light exiting part 110. Additionally, the second installation part 130 is configured to be penetrated inward and outward so that the second light source module 300 is detachably provided in the second installation part 130.

As can be seen in FIG. 1, the first installation part 120 and the second installation part 130 are provided in the housing 100.

The first installation part 120 is disposed to be opposite to the light exiting part 110 such that the lidar sensing light emitted from the first light source module 200, installed in the first installation part 120, may move straight toward the light exiting part 110 and exit through the light exiting part 110 to the outside.

The second installation part 130 may be provided between the first installation part 120 and the light exiting part 110. The second installation part 130 may be disposed in a direction orthogonal to a direction in which the lidar sensing light moves. FIG. 1 illustrates that the second installation part 130 is provided below the first installation part 120 in the housing 100. The second light source module 300, installed in the second installation part 130, emits the beam patterning light upward. Therefore, there is an overlap position at which the lidar sensing light emitted from the first light source module 200 and the beam patterning light emitted from the second light source module 300 overlap each other. The reflection unit 400 may be installed at the overlap position and adjust a movement position of the lidar sensing light and a movement position of the beam patterning light.

In particular, the second installation part 130 is configured to be penetrated toward the inside and outside of the housing 100. Therefore, the second light source module 300 may be detachably provided in the second installation part 130, such that replacing and installing the second light source module 300 may be more conveniently performed.

In addition, the second light source module 300 may include: a second light source part 310 configured to emit the beam patterning light; a heat sink 320 coupled to the second light source part 310 and configured to dissipate heat; and a reflective mirror 330. The reflective mirror 330 is configured to reflect the beam patterning light emitted from the second light source part 310 so that the beam patterning light moves to the movement path for the lidar sensing light.

Therefore, at the time of installing the second light source module 300 in the second installation part 130 of the housing 100, the second light source part 310 and the reflective mirror 330 are positioned in the housing 100. Further, the heat sink 320 is positioned outside the housing 100 such that the second light source part 310 and the reflective mirror 330 are protected in the housing 100. Additionally, the heat exchange efficiency of the heat sink 320, exposed to the outside, is improved, thereby ensuring cooling performance. Further, because the cooling performance implemented by the heat sink 320 is improved, it is possible to reduce the size of the heat sink 320.

In this case, the second light source part 310 may include an LED. The beam patterning light emitted from the second light source part 310 is reflected by the reflective mirror 330 and moved toward the path through which the lidar sensing light moves.

The first light source module 200 may include a first light source part 210 that is configured to emit the lidar sensing light. Additionally, the first light source module 200 may include a sensing part 220 that is configured to receive the lidar sensing light that exits through the light exiting part 110 and then returns by being reflected.

The first light source part 210 may be configured as an infrared laser. The sensing part 220 receives the lidar sensing light, which is emitted from the first light source part 210 and then returned by being reflected by an outside object. The sensing part 220 then converts the returned lidar sensing light into an electrical signal. The first light source module 200 may be used to identify a distance between a vehicle and an outside object.

The reflection unit 400 may include the mirror filter 410 provided at the position at which the lidar sensing light of the first light source module 200 and the beam patterning light of the second light source module 300 overlap each other. The mirror filter 410 is configured to transmit the lidar sensing light and reflect the beam patterning light. In particular, the mirror filter 410 may be tilted. Thus, the movement direction of the beam patterning light, which is reflected by the mirror filter 410 and moved to the light exiting part 110, may be changed.

In this case, the mirror filter 410 may be configured as a band-pass filter that transmits light in a particular wavelength range region but reflects light in other wavelength range regions.

Therefore, the lidar sensing light emitted from the first light source module 200 may be infrared rays in a wavelength range of 905 nm. Additionally, the beam patterning light emitted from the second light source module 300 may be visible rays in a wavelength range of 780 nm or less. Thus, the mirror filter 410 may transmit the infrared rays and reflect the visible rays.

In particular, the mirror filter 410 may be tilted. Therefore, the lidar sensing light emitted from the first light source module 200 passes through the mirror filter 410 without any change and exits through the light exiting part 110 even though the mirror filter 410 is tilted. However, the light exiting direction of the beam patterning light emitted from the second light source module 300 through the light exiting part 110 is changed in accordance with the tilting angle of the mirror filter 410, such that the low or high beam may be selectively implemented.

The reflection unit 400 includes the mirror filter 410 that is configured to transmit the lidar sensing light and reflect the beam patterning light, and a pivot bracket 420 that is tiltably installed in the housing 100 and connected to the mirror filter 410. The reflection unit 400 further includes a drive unit 430 installed in the housing 100, connected to the pivot bracket 420, and configured to adjust the tilting angle of the mirror filter 410 together with the pivot bracket 420 depending on whether the drive unit 430 operates.

As described herein, the reflection unit 400 includes the mirror filter 410, the pivot bracket 420, and the drive unit 430. In other words, the mirror filter 410 is installed in the housing 100 by the pivot bracket 420. When the pivot bracket 420 is tilted by the drive unit 430, the mirror filter 410 is tilted together with the pivot bracket 420. In this case, whether to operate the drive unit 430 may be determined in response to an instruction inputted through a controller C.

Specifically, the mirror filter 410 may be inclined at a preset angle with respect to the movement path for the lidar sensing light. Based on the Brewster angle, the preset angle may be set to an angle at which the lidar sensing light passes through the mirror filter 410 so that a loss of the lidar sensing light is minimized when the lidar sensing light passes through the mirror filter 410 at an initial installation angle of the mirror filter 410.

The pivot bracket 420 may include a fixed part 421 fixed to the housing 100 and a rotary part 422 tiltably installed on the fixed part 421. The mirror filter 410 is mounted on the rotary part 422 and the drive unit 430 is connected to the rotary part 422.

The fixed part 421 is installed in the housing 100 and fixed in position. The rotary part 422 is tiltably installed on the fixed part 421.

The mirror filter 410 is mounted on the rotary part 422 such that the angle of the mirror filter 410 is changed as the mirror filter 410 is tilted when the rotary part 422 is tilted. In this case, the mirror filter 410 may be installed on the rotary part 422 so as to be inclined so that the beam patterning light emitted from the second light source module 300 may be reflected and moved toward the light exiting part 110.

In addition, the drive unit 430 may be connected to the rotary part 422 such that the tilting angle of the rotary part 422 may be adjusted depending on whether the drive unit 430 operates.

In this case, the drive unit 430 may include a motor part 431 installed on the housing 100 and configured to transmit power. The drive unit 430 may also include a rod part 432 configured to rectilinearly move by receiving power from the motor part 431, connected to the rotary part 422, and configured to change the tilting angle of the mirror filter 410 together with the rotary part 422 in accordance with a movement position of the rod part 432.

The motor part 431 may be configured as a motor that may rotate forward or backward (e.g., in reverse). The rod part 432 may rectilinearly move by receiving power from the motor part 431, thereby changing the position of the rotary part 422. In other words, the rotary part 422 may be tilted when the rod part 432 is extended from or retracted into the motor part 431. The rotary part 422 and the rod part 432 may be connected by a hinge connection structure to implement a smooth mechanical operation.

Therefore, as illustrated in FIG. 1, at an initial position, the lidar sensing light emitted from the first light source module 200 passes through the mirror filter 410 of the reflection unit 400 and exits through the light exiting part 110. The beam patterning light emitted from the second light source module 300 is reflected by the reflective mirror 330 and exits through the light exiting part 110. At the initial position, the lidar sensing light and the beam patterning light may exit in the same direction.

In this case, as illustrated in FIG. 2, when the motor part 431 operates, the rod part 432 is moved, the pivot bracket 420 of the reflection unit 400 is tilted, and the mirror filter 410 is tilted together with the pivot bracket 420. Therefore, the lidar sensing light emitted from the first light source module 200 passes through the mirror filter 410 and exits through the light exiting part 110 without any change even though the mirror filter 410 is tilted. However, the beam patterning light emitted from the second light source module 300 may exit through the light exiting part 110 in a direction different from the direction of the lidar sensing light in accordance with the changed tilting angle of the mirror filter 410. Therefore, the beam patterning light emitted from the second light source module 300 is implemented as a low or high beam in accordance with the light exiting direction.

As described herein, in the present disclosure, the lidar sensing light may be implemented as a low or high beam by changing an emission position of the beam patterning light in a state in which the lidar sensing light is fixed to be emitted to a particular position.

In other words, whether to operate the drive unit 430 is determined by an instruction of the controller C. The controller C adjusts the tilting angle of the mirror filter 410 when an instruction to emit the low or high beam is provided by the controller C. When the controller provides the instruction to emit a low or high beam, the lidar sensing light is emitted toward the light exiting part 110 and the beam patterning light exits through the light exiting part 110 to a high-beam pattern region or a low-beam pattern region.

The controller C determines whether to implement a low or high beam depending on the driver's instruction or the traveling state. When the emission direction of the beam patterning light is determined by the controller C as described herein, the corresponding instruction is transmitted to the drive unit 430. The drive unit 430 adjusts the tilting angle of the mirror filter 410 based on the inputted instruction.

For example, as can be seen in FIG. 1, when the high-beam instruction is inputted, the drive unit 430 adjusts the tilting angle of the mirror filter 410, such that the lidar sensing light passes through the mirror filter 410 and exits through the light exiting part 110. The beam patterning light is reflected by the mirror filter 410 and exits through the light exiting part 110 to the high beam region.

As can be seen in FIG. 2, when the low-beam instruction is inputted, the drive unit 430 adjusts the tilting angle of the mirror filter 410, such that the beam patterning light is reflected by the mirror filter 410 and exits through the light exiting part 110 to the low beam region. The lidar sensing light passes through the mirror filter 410 without any change and exits through the light exiting part 110 in the fixed direction.

As described herein, in the present disclosure, the light exiting position of the beam patterning light is adjusted in accordance with the high or low beam, and the position at which the lidar sensing light exits through the light exiting part 110 is fixed. Therefore, it is possible to always detect an object disposed at the periphery of the vehicle.

The integrated lamp device for a vehicle, according to an embodiment, may also be applied to an embodiment illustrated in FIGS. 3 and 4 in accordance with a shape of the housing 100 and an installation position of the second light source module 300. In other words, a curvature of the reflective mirror 330, an installation angle of the mirror filter 410, and the like are adjusted in accordance with the installation position of the second light source module 300, such that the lidar sensing light and the beam patterning light may finally exit through the light exiting part 110.

As illustrated in FIGS. 5 and 6, an integrated lamp device for a vehicle according to another embodiment of the present disclosure includes a housing 100 having a light exiting part 110, and a first light source module 200 disposed in a direction orthogonal to an imaginary line A passing through the light exiting part 110 in the housing 100. The first light source module 200 is configured to emit lidar sensing light. The integrated lamp device further includes a second light source module 300 that is disposed in a direction orthogonal to the imaginary line A passing through the light exiting part 110 in the housing 100. The second light source module 300 is disposed at a position farther from the light exiting part 110 than the first light source module 200 and is configured to emit a beam patterning light. Additionally, the integrated lamp device includes a reflection unit 400 that includes a reflector 440 configured such that the lidar sensing light of the first light source module 200 and the beam patterning light of the second light source module 300 enter the reflector 440. The reflector 440 is configured to move the beam patterning light toward the light exiting part 110. Further, the reflection unit 400 includes a mirror filter 410 configured to reflect the lidar sensing light and transmit the beam patterning light. The reflector 440 and the mirror filter 410 are configured to be tiltable.

As described herein, in the present disclosure, the first light source module 200 for emitting the lidar sensing light and the second light source module 300 for emitting the beam patterning light are provided in the housing 100. The reflection unit 400 allows the lidar sensing light and the beam patterning light to exit through the light exiting part 110 to the outside.

In this case, the first light source module 200 and the second light source module 300 are disposed to be spaced apart from each other in the direction orthogonal to the imaginary line A passing through the light exiting part 110 of the housing 100. The first light source module 200 and the second light source module 300 are sequentially disposed in a direction away from the light exiting part 110.

In addition, the reflection unit 400 includes the mirror filter 410 that is disposed so that the lidar sensing light of the first light source module 200 enters the mirror filter 410. Further, the reflection unit 400 includes the reflector 440 that is disposed so that the beam patterning light of the second light source module 300 enters the reflector 440.

Therefore, the lidar sensing light emitted from the first light source module 200 may be reflected by the mirror filter 410 and exit through the light exiting part 110. Additionally, the beam patterning light emitted from the second light source module 300 may be reflected by the reflector 440, pass through the mirror filter 410, and then exit through the light exiting part 110. Therefore, the mirror filter 410 may be configured to reflect the infrared ray and transmit the visible ray.

In addition, the reflector 440 and the mirror filter 410 are configured to be tilted together, and the lidar sensing light and the beam patterning light are aimed in the same direction. Thus, it is possible to improve accuracy and ensure intuitive visual field and object detection.

Another embodiment is described specifically below. The housing 100 may include a first installation space 140, having the first light source module 200 provided in the direction orthogonal to the imaginary line A passing through the light exiting part 110. The housing 100 may also include a second installation space 150 provided to be spaced apart from the first installation space 140 in the direction away from the light exiting part 110 and to be penetrated inward and outward so that the second light source module 300 is detachably provided in the second installation space 150.

As can be seen in FIG. 5, the first installation space 140 and the second installation space 150 are provided in the housing 100. The first installation space 140 and the second installation space 150 are disposed to be spaced apart from each other in the direction orthogonal to the imaginary line A passing through the light exiting part 110. In particular, the second installation space 150 is configured to be penetrated toward the inside and outside of the housing 100. Therefore, the second light source module 300 may be detachably provided in the second installation part 130, such that replacing and installing the second light source module 300 may be conveniently performed.

In addition, the second light source module 300 may include a second light source part 310 configured to emit the beam patterning light, and a heat sink 320 coupled to the second light source part 310 and configured to dissipate heat. The second light source module 300 may further include a reflective mirror 330 that is configured to reflect the beam patterning light emitted from the second light source part 310 so that the beam patterning light moves to the movement path for the lidar sensing light.

Therefore, at the time of installing the second light source module 300 in the second installation part 130 of the housing 100, the second light source part 310 and the reflective mirror 330 are positioned in the housing 100. The heat sink 320 is positioned outside the housing 100 such that the second light source part 310 and the reflective mirror 330 are protected in the housing 100. Further, the heat exchange efficiency of the heat sink 320, exposed to the outside of the housing 100, is improved, thereby ensuring cooling performance. Further, because the cooling performance implemented by the heat sink 320 is improved, it is possible to reduce the size of the heat sink 320.

The reflection unit 400 may include the reflector 440 disposed at a position at which the beam patterning light moves. The reflector 440 is configured to reflect the beam patterning light so that the beam patterning light moves toward the light exiting part 110. Further, the reflection unit 400 may include the mirror filter 410 that is provided between the reflector 440 and the light exiting part 110 and is disposed at a position at which the lidar sensing light and the beam patterning light overlap each other. The mirror filter 410 is configured to reflect the lidar sensing light and transmit the beam patterning light. Additionally, the reflection unit 400 may include a pivot bracket 420 that is tiltably installed in the housing 100 and connected to allow the reflector 440 and the mirror filter 410 to be tilted at the same tilting angle. Furthermore, the reflection unit 400 may include a drive unit 430 that is installed in the housing 100, connected to the pivot bracket 420, and configured to adjust the tilting angle of the reflector 440 and the tilting angle of the mirror filter 410 depending on whether the drive unit 430 operates.

As described herein, the reflection unit 400, according to another embodiment, includes the reflector 440, the mirror filter 410, the pivot bracket 420, and the drive unit 430.

In this case, the reflector 440 and the mirror filter 410 are installed in the housing 100 by the pivot bracket 420. When the pivot bracket 420 is tilted by the drive unit 430, the reflector 440 and the mirror filter 410 are tilted together with the pivot bracket 420. In this case, whether to operate the drive unit 430 may be determined in response to an instruction inputted through the controller C.

Therefore, as illustrated in FIG. 5, at an initial position, the lidar sensing light emitted from the first light source module 200 is reflected by the mirror filter 410 of the reflection unit 400 and exits through the light exiting part 110. The beam patterning light emitted from the second light source module 300 is reflected by the reflective mirror 330, reflected by the reflector 440, passes through the mirror filter 410, and then exits through the light exiting part 110. At the initial position, the lidar sensing light and the beam patterning light exit in the same direction.

In this case, as illustrated in FIG. 6, when the pivot bracket 420 is tilted by the operation of the drive unit 430, the reflector 440 and the mirror filter 410 are tilted together with the pivot bracket 420. Therefore, the light exiting position of the lidar sensing light emitted from the first light source module 200 through the light exiting part 110 is changed by the tilting angle of the mirror filter 410. While the light exiting position of the beam patterning light emitted from the second light source module 300 through the light exiting part 110 is changed by the tilting angle of the reflector 440.

In this case, the mirror filter 410 and the reflector 440 installed on the pivot bracket 420 are tilted at the same tilting angle such that the lidar sensing light and the beam patterning light may exit in the same direction.

Therefore, in the present disclosure, it is possible to change the sensing position and implement the low beam/the high beam by changing the emission position of the lidar sensing light and the emission position of the beam patterning light.

Whether to operate the drive unit 430 is determined by an instruction of the controller C. The controller C adjusts the tilting angle of the reflector 440 and the tilting angle of the mirror filter 410 when an instruction to emit the low or high beam is made by the controller C. Thus, the lidar sensing light and the beam patterning light exit through the light exiting part 110 in the same direction to the high-beam pattern region or the low-beam pattern region.

The controller C determines whether to implement a low or high beam depending on the driver's instruction or the traveling state. When the light emission direction is determined by the controller C as described herein, the corresponding instruction is transmitted to the drive unit 430. The drive unit 430 adjusts the tilting angle of the reflector 440 and the tilting angle of the mirror filter 410 based on the inputted instruction.

For example, as can be seen in FIG. 5, when the high-beam instruction is inputted, the drive unit 430 adjusts the tilting angle of the reflector 440 and the tilting angle of the mirror filter 410 by adjusting the position of the pivot bracket 420. The lidar sensing light is reflected by the mirror filter 410 and exits through the light exiting part 110 to the high beam region. The beam patterning light is reflected by the reflective mirror 330, the reflector 440, passes through the mirror filter 410, and exits through the light exiting part 110 to the high beam region. Therefore, it is possible to ensure the lighting effect on the high beam region and the sensing accuracy on the high beam region.

As can be seen in FIG. 6, when the low-beam instruction is inputted, the drive unit 430 adjusts the tilting angle of the reflector 440 and the tilting angle of the mirror filter 410 by adjusting the position of the pivot bracket 420. The lidar sensing light is reflected by the mirror filter 410 and exits through the light exiting part 110 to the low beam region. The beam patterning light is reflected by the reflective mirror 330, the reflector 440, passes through the mirror filter 410, and then exits through the light exiting part 110 to the low beam region. Therefore, it is possible to ensure the lighting effect on the low beam region and the sensing accuracy on the low beam region.

As illustrated in FIG. 7, in the present disclosure, the lidar sensing region and the low or high beam region are integrated, which makes it possible to decrease a region of a headlamp required to implement a low or high beam.

According to the integrated lamp device for a vehicle structured as described herein, the first light source module 200 for lidar sensing and the second light source module 300 for beam patterning are installed in the single housing 100, thereby reducing the overall size. Further, the aiming adjustment is performed by the reflection unit 400 that is separated from the light source modules, thereby stabilizing the structure and ensuring the durability performance.

While the specific embodiments of the present disclosure have been illustrated and described, it should be apparent to those having ordinary skill in the art that the embodiments of the present disclosure may be variously modified and changed without departing from the technical spirit of the present disclosure defined in the appended claims.

What is claimed is:

1. An integrated lamp device for a vehicle, the integrated lamp device comprising:
- a housing having a light exiting part;
- a first light source module disposed in a direction orthogonal to an imaginary line passing through the light exiting part in the housing, the first light source module being configured to emit lidar sensing light;
- a second light source module disposed in a direction orthogonal to the imaginary line passing through the light exiting part in the housing, the second light source module disposed at a position farther from the light exiting part than the first light source module and configured to emit beam patterning light; and
- a reflection unit including
  - a reflector configured such that the lidar sensing light of the first light source module and the beam patterning light of the second light source module enter the reflector, the reflector being configured to move the beam patterning light toward the light exiting part,
  - a mirror filter configured to reflect the lidar sensing light and transmit the beam patterning light, the mirror filter being provided between the reflector and the light exiting part and disposed at a position at which the lidar sensing light and the beam patterning light overlap each other, the mirror filter being configured to reflect the lidar sensing light and transmit the beam patterning light, and
  - a pivot bracket tiltably installed in the housing,
- wherein the reflector and the mirror filter are configured to be tiltable, and
- wherein the pivot bracket is connected to allow the reflector and the mirror filter to be tilted at the same tilting angle.

2. The integrated lamp device of claim 1, wherein the housing comprises:
- a first installation space having the first light source module provided in the direction orthogonal to the imaginary line passing through the light exiting part; and
- a second installation space provided to be spaced apart from the first installation space in a direction away from the light exiting part and to be penetrated inward and outward so that the second light source module is detachably provided in the second installation space.

3. The integrated lamp device of claim 1, wherein the reflection unit comprises:
- the reflector disposed at a position at which the beam patterning light moves, the reflector being configured to reflect the beam patterning light so that the beam patterning light moves toward the light exiting part; and
- a drive unit installed in the housing, connected to the pivot bracket, and configured to adjust a tilting angle of the reflector and a tilting angle of the mirror filter depending on whether the drive unit operates.

4. The integrated lamp device of claim 3, wherein:
- whether to operate the drive unit is determined by an instruction of a controller; and
- the controller adjusts the tilting angle of the reflector and the tilting angle of the mirror filter when an instruction to emit a low or high beam is made by the controller, such that the lidar sensing light and the beam patterning light exit through the light exiting part in the same direction to a high-beam pattern region or a low-beam pattern region.

5. The integrated lamp device of claim 1, wherein the first light source module comprises:
- a first light source part configured to emit the lidar sensing light; and
- a sensing part configured to receive the lidar sensing light that exits through the light exiting part and returns by being reflected.

6. The integrated lamp device of claim 1, wherein the second light source module comprises:
- a second light source part configured to emit the beam patterning light;
- a heat sink coupled to the second light source part and configured to dissipate heat; and
- a reflective mirror configured to reflect the beam patterning light emitted from the second light source part so that the beam patterning light moves to a movement path for the lidar sensing light.

7. The integrated lamp device of claim 1, wherein the mirror filter is inclined at a preset angle with respect to a movement path for the lidar sensing light.

8. The integrated lamp device of claim 1, wherein the pivot bracket comprises a fixed part fixed to the housing and a rotary part tiltably installed on the fixed part, wherein the mirror filter is mounted on the rotary part, and wherein the drive unit is connected to the rotary part.

9. The integrated lamp device of claim 8, wherein the drive unit comprises:
- a motor part installed on the housing and configured to transmit power; and
- a rod part connected to the rotary part, configured to rectilinearly move by receiving power from the motor part, and configured to change the tilting angle of the mirror filter together with the rotary part in accordance with a movement position of the rod part.

* * * * *